US012597244B2

(12) United States Patent
Cho et al.

(10) Patent No.: US 12,597,244 B2
(45) Date of Patent: Apr. 7, 2026

(54) METHOD AND DEVICE FOR IMPROVING OBJECT RECOGNITION RATE OF SELF-DRIVING CAR

(71) Applicant: 42DOT INC., Seoul (KR)

(72) Inventors: Myoung Hoon Cho, Seoul (KR); Jae Yun Lee, Gwangju (KR); Phuoc Tien Nguyen, Suwon (KR)

(73) Assignee: 42DOT INC., Seoul (KR)

( * ) Notice: Subject to any disclaimer, the term of this patent is extended or adjusted under 35 U.S.C. 154(b) by 309 days.

(21) Appl. No.: 18/346,894

(22) Filed: Jul. 5, 2023

(65) Prior Publication Data

US 2024/0020964 A1 Jan. 18, 2024

(30) Foreign Application Priority Data

| | | |
|---|---|---|
| Jul. 18, 2022 | (KR) | 10-2022-0088365 |
| Sep. 30, 2022 | (KR) | 10-2022-0125754 |
| Sep. 30, 2022 | (KR) | 10-2022-0125755 |

(51) Int. Cl.
*G06V 10/82* (2022.01)
*G06V 20/58* (2022.01)

(52) U.S. Cl.
CPC .............. *G06V 10/82* (2022.01); *G06V 20/58* (2022.01)

(58) Field of Classification Search
None
See application file for complete search history.

(56) References Cited

U.S. PATENT DOCUMENTS

| | | | | |
|---|---|---|---|---|
| 2018/0253630 A1* | 9/2018 | Tamer | .................... | H04N 23/40 |
| 2020/0401791 A1* | 12/2020 | Gao | ...................... | G06V 10/774 |
| 2022/0139217 A1* | 5/2022 | Lin | ......................... | G06V 20/52 |
| | | | | 340/937 |
| 2023/0029977 A1* | 2/2023 | Obradovic | ............ | H04L 47/826 |
| 2023/0088414 A1* | 3/2023 | Toni | ....................... | G06N 20/00 |
| | | | | 382/103 |
| 2023/0186653 A1* | 6/2023 | Sawai | ................... | B60W 40/08 |

(Continued)

FOREIGN PATENT DOCUMENTS

| | | |
|---|---|---|
| JP | 2017-523498 A | 8/2017 |
| JP | 2017-168029 A | 9/2017 |

(Continued)

OTHER PUBLICATIONS

Hu HN, Yang YH, Fischer T, Darrell T, Yu F, Sun M. Monocular quasi-dense 3d object tracking. IEEE Transactions on Pattern Analysis and Machine Intelligence. Apr. 19, 2022;45(2):1992-2008. (Year: 2022).*

(Continued)

*Primary Examiner* — Michelle M Entezari Hausmann
(74) *Attorney, Agent, or Firm* — Harvest IP Law, LLP

(57) ABSTRACT

Provided is a method of improving an object recognition rate including recognizing a first object in a first image obtained while driving, detecting whether the recognized first object has disappeared for a preset time period and then reappeared in the first image, based on detecting that the first object has reappeared, calculating training data for the first object, and controlling such that a recognition model for recognizing an object included in an image is to be trained based on information based on the calculated training data.

13 Claims, 15 Drawing Sheets

(56) References Cited

U.S. PATENT DOCUMENTS

| | | | | |
|---|---|---|---|---|
| 2023/0206684 A1* | 6/2023 | Torabi | ..................... | G06N 3/045 |
| | | | | 382/104 |
| 2024/0163402 A1* | 5/2024 | Kario | ..................... | G06V 20/58 |
| 2025/0078927 A1* | 3/2025 | Yu | ..................... | G11C 16/0483 |

FOREIGN PATENT DOCUMENTS

| | | | |
|---|---|---|---|
| JP | 2020-191036 A | 11/2020 |
| KR | 10-2020-0061118 A | 6/2020 |
| KR | 10-2021-0110713 A | 9/2021 |
| KR | 10-2318586 B1 | 10/2021 |
| KR | 10-2021-0152025 A | 12/2021 |
| KR | 102438114 B1 | 8/2022 |
| WO | 2021-215740 A1 | 10/2021 |

OTHER PUBLICATIONS

Valmadre J, Bertinetto L, Henriques JF, Tao R, Vedaldi A, Smeulders AW, Torr PH, Gavves E. Long-term tracking in the wild: A benchmark. InProceedings of the European conference on computer vision (ECCV) 2018 (pp. 670-685). (Year: 2018).*

Supancic III, James, and Deva Ramanan. "Tracking as online decision-making: Learning a policy from streaming videos with reinforcement learning." Proceedings of the IEEE international conference on computer vision. 2017. (Year: 2017).*

Zhao D, Fu H, Xiao L, Wu T, Dai B. Multi-object tracking with correlation filter for autonomous vehicle. Sensors. Jun. 22, 2018;18(7): 2004. (Year: 2018).*

Lei, Bangjun, and Li-Qun Xu. "Real-time outdoor video surveillance with robust foreground extraction and object tracking via multi-state transition management." Pattern Recognition Letters 27.15 (2006): 1816-1825. (Year: 2006).*

Tokmakov, Pavel, et al. "Learning to track with object permanence." Proceedings of the IEEE/CVF international conference on computer vision. 2021. (Year: 2021).*

Type Classification, Color Estimation, and Specific Target Detection of Moving Objects on General Streets (Jul. 2003).

* cited by examiner (x, y, width, height, moving)

FIG. 9

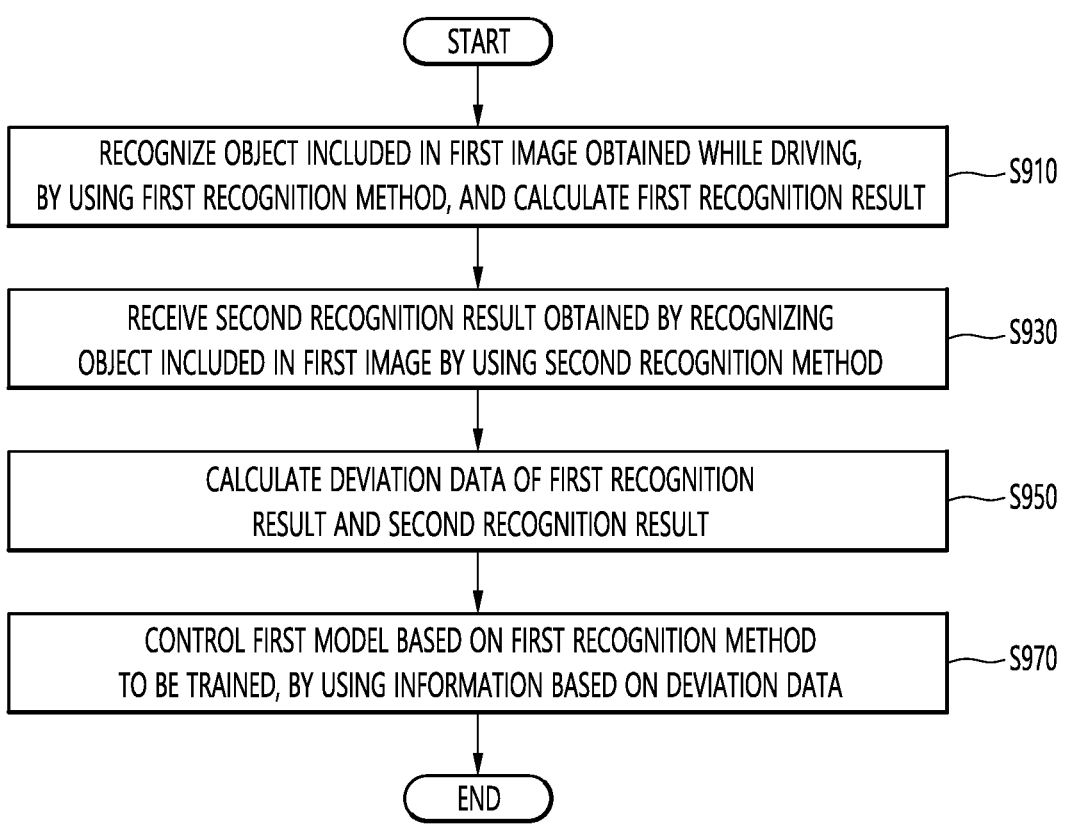

START

RECOGNIZE OBJECT INCLUDED IN FIRST IMAGE OBTAINED WHILE DRIVING, BY USING FIRST RECOGNITION METHOD, AND CALCULATE FIRST RECOGNITION RESULT ⎯ S910

RECEIVE SECOND RECOGNITION RESULT OBTAINED BY RECOGNIZING OBJECT INCLUDED IN FIRST IMAGE BY USING SECOND RECOGNITION METHOD ⎯ S930

CALCULATE DEVIATION DATA OF FIRST RECOGNITION RESULT AND SECOND RECOGNITION RESULT ⎯ S950

CONTROL FIRST MODEL BASED ON FIRST RECOGNITION METHOD TO BE TRAINED, BY USING INFORMATION BASED ON DEVIATION DATA ⎯ S970

END i th
frame i+1 th
frame i+2 th
frame i+3 th
frame

METHOD AND DEVICE FOR IMPROVING OBJECT RECOGNITION RATE OF SELF-DRIVING CAR

CROSS-REFERENCE TO RELATED APPLICATION

This application is based on and claims priority under 35 U.S.C. § 119 to Korean Patent Application No. 10-2022-0088365, filed on Jul. 18, 2022, No. 10-2022-0125754, filed on Sep. 30, 2022, and No. 10-2022-0125755, filed on Sep. 30, 2022 in the Korean Intellectual Property Office, the disclosure of which is incorporated by reference herein in its entirety.

BACKGROUND

1. Field

The present disclosure relates to a method and device for improving the object recognition rate of a self-driving car, and more particularly, to an object recognition rate improvement method and apparatus for improving the performance of a self-driving car capable of recognizing an object and performing self-driving, in recognizing an object on a road while driving.

2. Description of the Related Art

Along with the merging of information communication technology and the vehicle industry, smartization of vehicles is rapidly progressing. The smartization of vehicles enables the vehicles to evolve from simple mechanical devices to smart cars, and in particular, self-driving is attracting attention as a core technology of smart cars. Self-driving is a technology in which a self-driving module installed in a vehicle actively controls the driving state of the vehicle, thereby allowing the vehicle to reach its destination on its own without requiring a driver to manipulate the steering wheel, accelerator pedal, or brake.

Although various studies for safe self-driving of self-driving cars have been conducted on methods of allowing vehicles to accurately recognize pedestrians or other vehicles and calculate the distance to a recognized object during a self-driving process, there is currently no known method for perfectly recognizing objects on a road because features of an object that may appear on a road while a vehicle is driving are virtually infinite and there is a limit to the processing capability of modules mounted on self-driving cars.

When recognizing an object and estimating a distance by using a camera, a lot of distance information is lost because the object in the real world is projected onto a two-dimensional image. In particular, a large deviation of features that are frequently used in calculating the location of a pedestrian (the height of the pedestrian or the point at which the pedestrian is in contact with the ground) causes a wide margin of error.

In object recognition and distance estimation through radar, due to the nature of radio waves of the radar, the ability to quickly identify and classify objects is poor, and thus it is difficult to distinguish between pedestrians and vehicles, and in particular, a result of recognizing a pedestrian or a two-wheeled vehicle (e.g., a bicycle or a motorcycle) on a road tends to be worse because the signal strength is low.

Recently, object recognition and distance estimation technology using lidar has been in the spotlight due to its relatively high accuracy, however, lidar needs to operate based on lasers with low power because high-power lasers are dangerous, lasers are greatly affected by the surrounding environment unlike radio waves of radar, and the costs of lidar sensors are significantly expensive.

The related art described above is technical information that the inventor(s) of the present disclosure has achieved to derive the present disclosure or has achieved during the derivation of the present disclosure, and thus, it cannot be considered that the related art has been published to the public before the filing of the present disclosure.

SUMMARY

Provided is a method for improving the object recognition rate of a self-driving car.

Additional aspects will be set forth in part in the description which follows and, in part, will be apparent from the description, or may be learned by practice of the presented embodiments of the disclosure.

According to an aspect of an embodiment, a method of improving an object recognition rate of a self-driving car includes recognizing a first object in a first image obtained while driving, detecting whether the recognized first object has disappeared for a preset time period and then reappeared in the first image, based on detecting that the first object has reappeared, calculating training data for the first object, and controlling such that a recognition model for recognizing an object included in an image is to be trained based on information based on the calculated training data.

The method may further include recognizing a second object in a second image obtained while driving without frame loss by recognizing the second object included in the second image by using a recognition method of the trained recognition model.

In the method, the first image may include at least three frames, and the preset time period may be a time range value for at least one frame.

In the method, the first image may include at least three frames, and the preset time period may be a time range value for one frame to three frames.

In the method, the training data may include information about a class of the first object and a history of the first object reappearing after disappearing for the preset time period after being first recognized.

In the method, the training data may further include information about a confidence of the first object.

The method may further include calculating information based on the calculated training data by filtering the calculated training data based on a preset filtering criterion.

In the method, the first video is a video including a plurality of frames, the preset filtering criterion may be a filtering criterion for a time length of a series of frames in which the first object has disappeared for the preset time period in a second frame after being recognized in a first frame and then reappeared in a third frame, the calculating of the information based on the calculated training data may include, based on a time length between the first frame and the third frame being longer than a reference frame length, calculating the information based on the training data, and the reference frame length may be determined according to at least one of a frame rate of the first image, a moving speed of the first object in the first image, a field of view of a camera that has captured the first image, an angle of the camera that has captured the first image, and a distortion rate of a lens of the camera that has captured the first image.

In the method, the first image may be a video including a plurality of frames, the preset filtering criterion may be a classification criterion for identifying a type of the first object that has disappeared for the preset time period in a second frame after being recognized in a first frame and then reappeared in a third frame, and the calculating of the information based on the calculated training data may include, based on the type of the first object being a car, a truck, a bus, or a miscellaneous object, calculating the information based on the training data.

In the method, the first image may be a video including a plurality of frames, the preset filtering criterion may be a size criterion for identifying a size of the first object that has disappeared for the preset time period in a second frame after being recognized in a first frame and then reappeared in a third frame, and the calculating of the information based on the calculated training data may include, based on a height of the first object being greater than a preset number of pixels, calculating the information based on the training data.

In the method, the first image may be a video including a plurality of frames, the preset filtering criterion may be a size criterion for identifying a size of the first object that has disappeared for the preset time period in a second frame after being recognized in a first frame and then reappeared in a third frame, and the calculating of the information based on the calculated training data may include, based on a width of the first object being greater than a preset number of pixels, calculating the information based on the training data.

In the method, the information based on the calculated training data may be information obtained by applying active learning to the calculated training data.

In the method, the information based on the calculated training data may be information obtained by labeling a type of an object included in the training data through an input by a user.

According to an aspect of another embodiment, a device for improving an object recognition rate of a self-driving car includes a memory storing at least one program, and A processor configured to perform an operation by executing the at least one program, wherein the processor is further configured to recognize a first object in a first image obtained while driving, detect whether the recognized first object has disappeared for a preset time period and then reappeared in the first image, based on detecting that the first object has reappeared, calculate training data for the first object, and control a recognition model for recognizing an object included in an image to be trained based on information based on the calculated training data.

According to an aspect of another embodiment, provided is a computer-readable recording medium having recorded thereon a program for executing the method.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a flowchart illustrating an example of a method of improving an object recognition rate according to the present disclosure;

DETAILED DESCRIPTION

Figure 1:
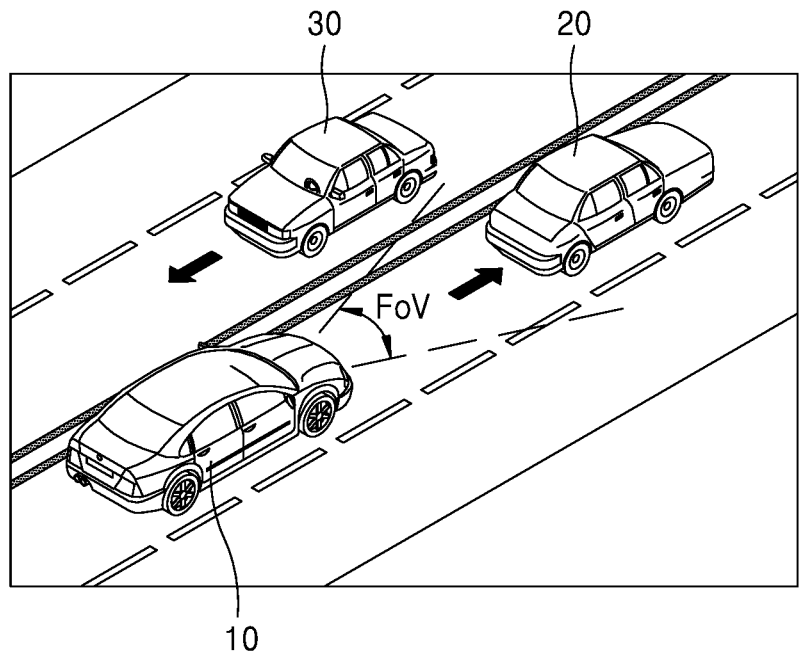
FIGS. 1 to 3 are diagrams for describing a self-driving method according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As the present disclosure allows for various changes and numerous embodiments, particular embodiments will be illustrated in the drawings and described in detail. The effects and features of the present disclosure and methods of achieving them will become clear with reference to the embodiments described in detail below with the drawings. However, the present disclosure is not limited to the embodiments disclosed below, and may be implemented in various forms.

Hereinafter, embodiments of the present disclosure will be described in detail with reference to the accompanying drawings, and the same or corresponding components will be denoted by the same reference numerals when described with reference to the accompanying drawings, and thus, their descriptions that are already provided will be omitted.

In the following embodiments, terms such as "first," "second," etc., are used only to distinguish one component from another, and such components must not be limited by these terms.

In the following embodiments, the singular expression also includes the plural meaning as long as it is not inconsistent with the context.

In the following embodiments, the terms "comprises," "includes," "has", and the like used herein specify the presence of stated features or components, but do not preclude the presence or addition of one or more other features or components.

When a certain embodiment may be differently implemented, particular operations may be performed differently from the sequence described herein. For example, two processes, which are successively described herein, may be substantially simultaneously performed, or may be performed in a process sequence opposite to a described process sequence.

Figure 2:
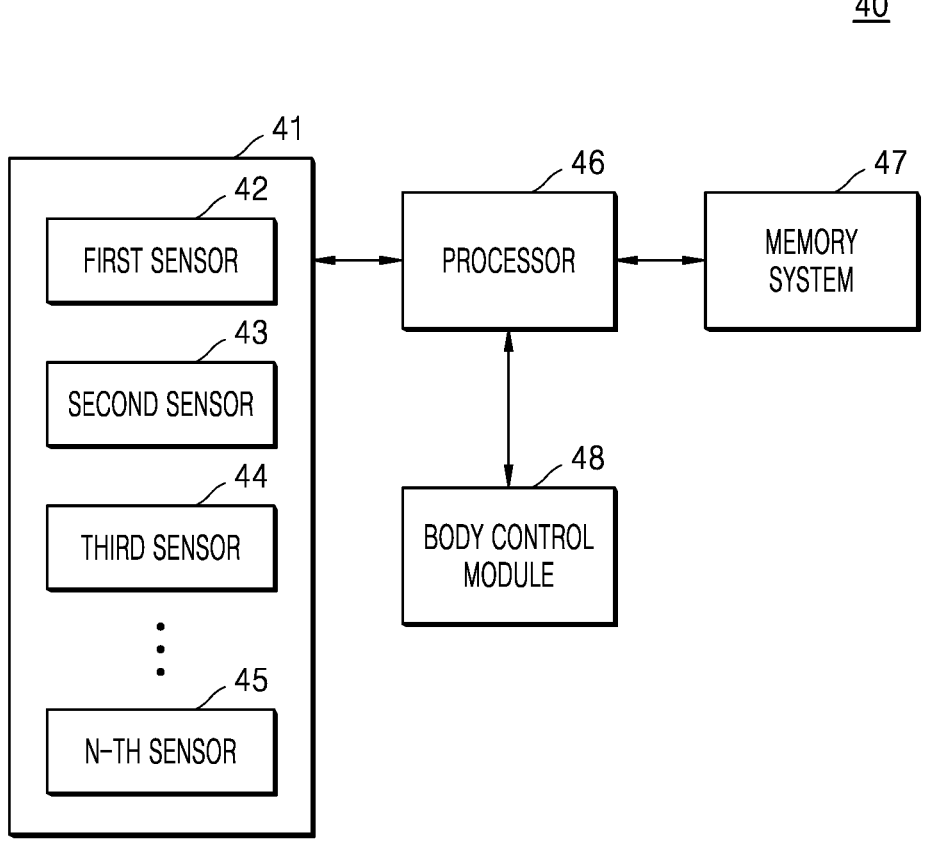
Figure 3:
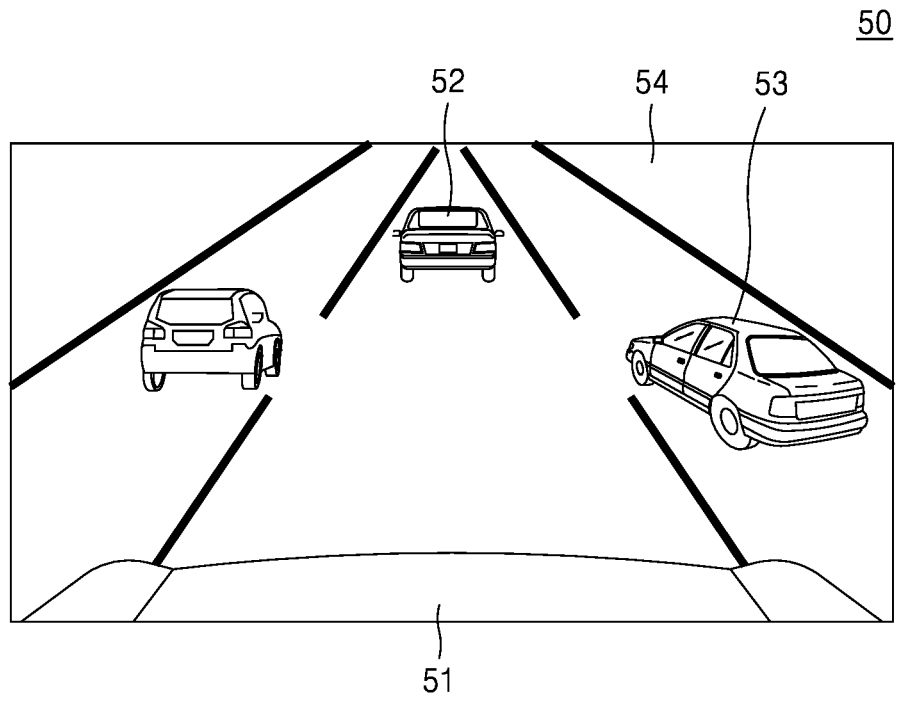

FIGS. 1 to 3 are diagrams for describing a self-driving method according to an embodiment.

Referring to FIG. 1, a self-driving apparatus according to an embodiment of the present disclosure may be mounted on a vehicle to implement a self-driving car 10. The self-driving apparatus mounted on the self-driving car 10 may include various sensors configured to collect situational information around the self-driving car 10. For example, the self-driving apparatus may detect a movement of a preceding vehicle 20 traveling in front of the self-driving car 10, through an image sensor and/or an event sensor mounted on the front side of the self-driving car 10. The self-driving apparatus may further include sensors configured to detect, in addition to the preceding vehicle 20 traveling in front of the self-driving car 10, another traveling vehicle 30 traveling in an adjacent lane, and pedestrians around the self-driving car 10.

At least one of the sensors configured to collect the situational information around the self-driving car may have a certain field of view (FoV) as illustrated in FIG. 1. For example, in a case in which a sensor mounted on the front side of the self-driving car 10 has a FoV as illustrated in FIG. 1, information detected from the center of the sensor may have a relatively high importance. This may be because most of information corresponding to the movement of the preceding vehicle 20 is included in the information detected from the center of the sensor.

The self-driving driving apparatus may control the movement of the self-driving car 10 by processing information collected by the sensors of the self-driving car 10 in real time, while storing, in a memory device, at least part of the information collected by the sensors.

Referring to FIG. 2, a self-driving apparatus 40 may include a sensor unit 41, a processor 46, a memory system 47, a body control module 48, and the like. The sensor unit 41 may include a plurality of sensors 42 to 45, and the plurality of sensors 42 to 45 may include an image sensor, an event sensor, an illuminance sensor, a global positioning system (GPS) device, an acceleration sensor, and the like.

Data collected by the sensors 42 to 45 may be delivered to the processor 46. The processor 46 may store, in the memory system 47, the data collected by the sensors 42 to 45, and control the body control module 48 based on the data collected by the sensors 42 to 45 to determine the movement of the vehicle. The memory system 47 may include two or more memory devices and a system controller configured to control the memory devices. Each of the memory devices may be provided as a single semiconductor chip.

In addition to the system controller of the memory system 47, each of the memory devices included in the memory system 47 may include a memory controller, which may include an artificial intelligence (AI) computation circuit such as a neural network. The memory controller may generate computational data by applying certain weights to data received from the sensors 42 to 45 or the processor 46, and store the computational data in a memory chip.

FIG. 3 is a diagram illustrating an example of image data obtained by a sensor of a self-driving car on which a self-driving apparatus is mounted. Referring to FIG. 3, image data 50 may be data obtained by a sensor mounted on the front side of the self-driving car. Thus, the image data 50 may include a front area 51 of the self-driving car, a preceding vehicle 52 traveling in the same lane as the self-driving car, a traveling vehicle 53 around the autonomous vehicle, a region of non-interest 54, and the like.

In the image data 50 according to the embodiment illustrated in FIG. 3, data regarding a region including the front area 51 of the self-driving car and the region of non-interest 54 may be unlikely to affect the driving of the self-driving car. In other words, the front area 51 of the self-driving car and the region of non-interest 54 may be determined as data having a relatively low importance.

On the other hand, the distance to the preceding vehicle 52 and a movement of the traveling vehicle 53 to change lanes or the like may be significantly important factors in terms of safe driving of the self-driving car. Accordingly, data regarding a region including the preceding vehicle 52 and the traveling vehicle 53 in the image data 50 may have a relatively high importance in terms of the driving of the self-driving car.

A memory device of the self-driving apparatus may apply different weights to different regions of the image data 50 received from a sensor, and then store the image data 50. For example, a high weight may be applied to the data regarding the region including the preceding vehicle 52 and the traveling vehicle 53, and a low weight may be applied to the data regarding the region including the front area 51 of the self-driving car and the region of non-interest 54.

Figure 4A:
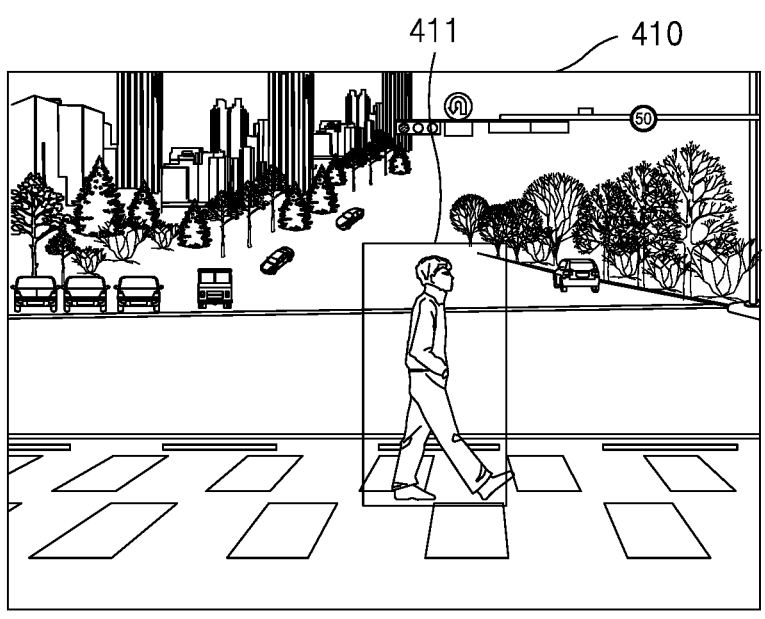
FIGS. 4A and 4B are diagrams related to a camera configured to photograph the outside of a vehicle, according to an embodiment.
Figure 4B:
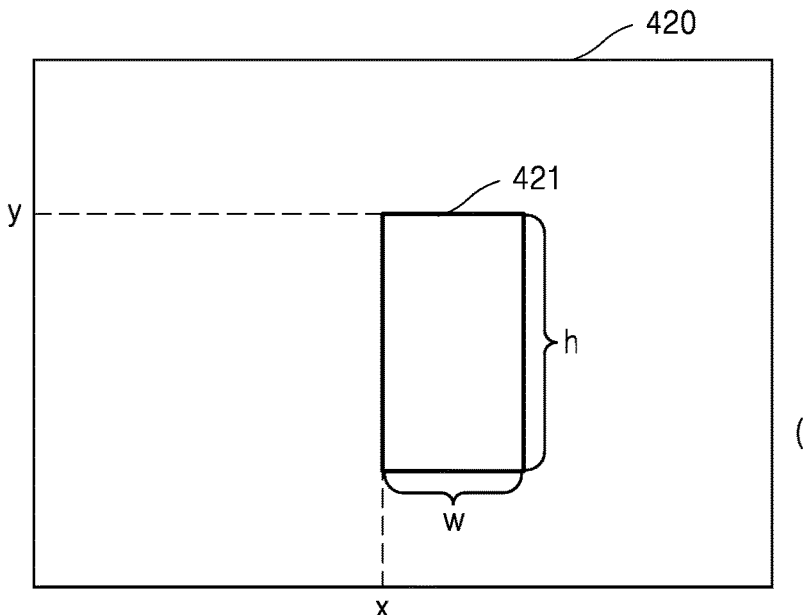

FIGS. 4A and 4B are diagrams related to a camera configured to photograph the outside of a vehicle, according to an embodiment.

The camera may be mounted on the vehicle to photograph the outside of the vehicle. The camera may photograph front, side, and rear areas around the vehicle. A device for improving an object recognition rate according to the present disclosure may obtain a plurality of images captured by the camera. The plurality of images captured by the camera may include a plurality of objects.

Information about an object includes object type information and object attribute information. Here, the object type information is index information indicating the type of object, and is composed of a group indicating a supercategory, and a class indicating a subcategory. In addition, the object attribute information indicates attribute information about the current state of the object, and includes action information, rotation information, traffic information, color information, and visibility information.

In an embodiment, groups and classes included in the object type information may be as shown in Table 1 below, but are not limited thereto.

TABLE 1

| Group | Class |
|---|---|
| Flat | Road, Sidewalk, Parking, Ground, Crosswalk |
| Human | Pedestrian, Rider |
| Vehicle | Car, Truck, Bus |
| Construction | Building Wall, Guard rail, Tunnel, fence, gas station, pylon |

TABLE 1-continued

| Group | Class |
|---|---|
| Object | Pole, Traffic sign, Traffic light, color corn |
| Nature | vegetation, terrain, paddy field, river, lake |
| Void | Static |
| Lane | Dotted line, Solid line, Dotted and Solid line, Double Solid line |
| Sky | Sky |
| Animal | Dog, Cat, bird |

In addition, information included in the object attribute information may include Action information, Rotate information, Traffic information, Color information, and Visibility information.

Action information represents a movement of an object, and may be defined as 'Stopped', 'Parking', 'Moving', or the like. Object attribute information of a vehicle may be determined as 'Stopped', 'Parking', or 'Moving', object attribute information of a pedestrian may be determined as 'Moving', 'Stopped', or 'Unknown', and object attribute information of an immovable object, such as a traffic light, may be determined as 'Stopped', which is a default.

Rotate information represents the rotation of an object, and may be defined as 'Forward', 'Backward', 'Horizontal', 'Vertical', 'Lateral', or the like. Object attribute information of a vehicle may be determined as 'Front', 'Rear', or 'Side', and object attribute information of a horizontal or vertical traffic light may be determined as 'Horizontal' or 'Vertical'.

Traffic information refers to traffic-related information of an object, and may be defined as 'Instruction', 'Caution', 'Regulation', 'Auxiliary sign', or the like of a traffic sign. Color information is information about the color of an object, and may represent the color of an object, a traffic light, or a traffic sign.

Referring to FIG. 4A, an object 411 may be a pedestrian. An image 410 may have a certain size. A plurality of images 410 may include the same object 411, but as the vehicle travels along the road, the relative locations of the vehicle and the object 411 continuously change, and as the object 411 also moves over time, the location of the same object 411 in the images changes.

Using all images to determine which object is the same in the images causes significant increases in the amount of data transmission and the amount of computation. Accordingly, it is difficult to perform processing through edge computing on an apparatus mounted on a vehicle, and it is also difficult to perform real-time analysis.

Referring to FIG. 4B, a bounding box 421 included in an image 420 is illustrated. A bounding box is metadata about an object, and bounding box information may include object type information (e.g., group, class, etc.), information about location on the image 420, size information, and the like.

Referring to FIG. 4B, the bounding box information may include information that the object 411 corresponds to a pedestrian class, information that the upper left vertex of the object 411 is located at (x, y) on the image, information that the size of the object 411 is w×h, and current state information that the object 411 is moving (i.e., Action information).

Figure 5:
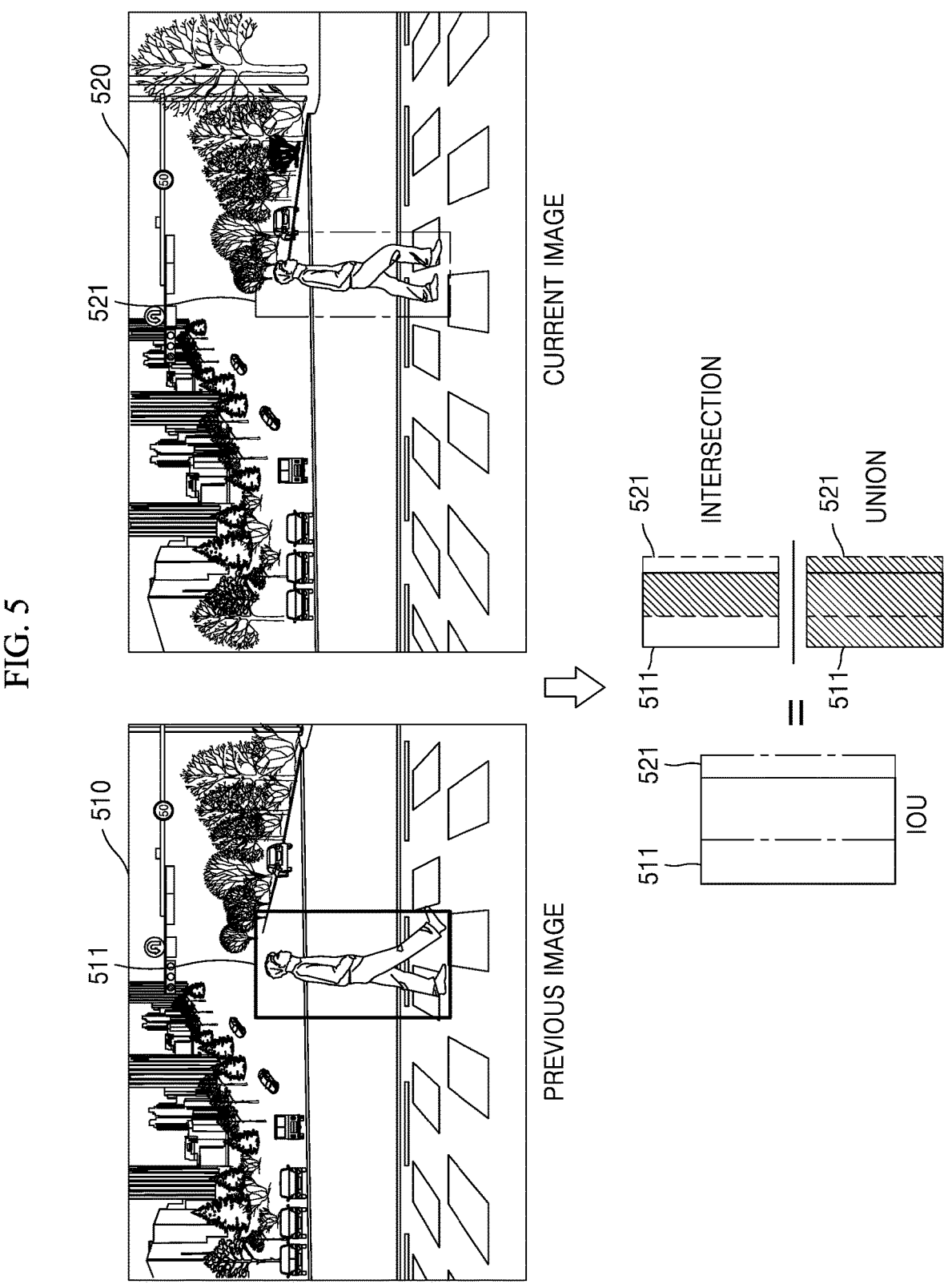
FIG. 5 is a flowchart illustrating a method of recognizing an object according to an embodiment.

FIG. 5 is a flowchart illustrating a method of recognizing an object according to an embodiment.

The device for improving an object recognition rate may obtain a plurality of frames by dividing a video obtained from a camera into frames. The plurality of frames may include a previous frame 510 and a current frame 520.

The device for improving an object recognition rate may recognize a first pedestrian object 511 in the previous frame 510.

In an embodiment, the device for improving an object recognition rate may divide a frame into grids having the same size, predict the number of bounding boxes designated in a predefined shape around the center of each grid, and calculate a confidence based on a result of the predicting. The device for improving an object recognition rate may determine whether an object is included in the frame or only a background is included, select a location having a high object confidence, and determine an object category, thereby recognizing the object. However, the method of recognizing an object in the present disclosure is not limited thereto.

The device for improving an object recognition rate may obtain first location information of the first pedestrian object 511 recognized in the previous frame 510. As described above with reference to FIGS. 4A and 4B, the first location information may include coordinate information of any one vertex (e.g., the upper left vertex) of a bounding box corresponding to the first pedestrian object 511 on the previous frame 510, and horizontal and vertical length information.

In addition, the device for improving an object recognition rate may obtain second location information of a second pedestrian object 521 recognized in the current frame 520.

The device for improving an object recognition rate may calculate a similarity between the first location information of the first pedestrian object 511 recognized in the previous frame 510, and the second location information of the second pedestrian object 521 recognized in the current frame 520.

Referring to FIG. 5, the device for improving an object recognition rate may calculate an intersection and a union between the first pedestrian object 511 and the second pedestrian object 521 by using the first location information and the second location information. The device for improving an object recognition rate may calculate a value of an intersection area with respect to a union area, and based on the calculated value being greater than or equal to a threshold value, determine that the first pedestrian object 511 and the second pedestrian object 521 are the same pedestrian object.

However, the method of determining identity between objects is not limited to the above method.

Figure 6:
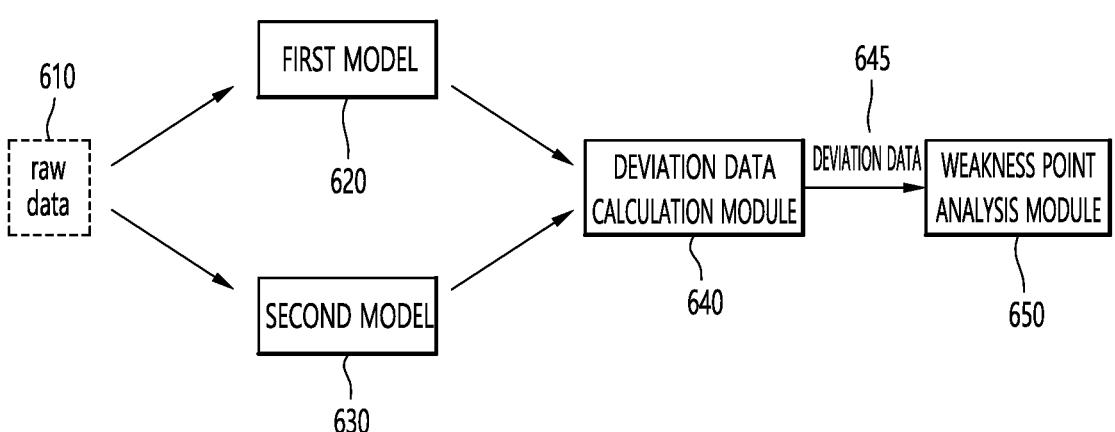
FIG. 6 is a diagram for conceptually describing a method of improving an object recognition rate of a self-driving car, according to an embodiment of the present disclosure.

FIG. 6 is a diagram for conceptually describing a method of improving an object recognition rate of a self-driving car, according to an embodiment of the present disclosure.

Summarizing an embodiment of the present disclosure with reference to FIG. 6, in an embodiment of the present disclosure, when raw data 610 is input through a first model 620 and a second model 630, a deviation data calculation module 640 receives and processes result data calculated by each model to calculate deviation data 645, and a weakness point analysis module 650 receives and analyzes the calculate deviation data 645 to identify a weakness point.

In more detail, in the present disclosure, the raw data 610 refers to images collected by a camera module installed in a self-driving car. In particular, the raw data 610 refers to video data that has not been preprocessed after being generated by the camera module, the raw data 610 is composed of a plurality of frames, and the frame rate may be 60 frames per second but is not limited thereto.

The first model 620 is a model installed in the self-driving car, and refers to a model configured to receive the raw data 610 as input data and output a result of recognizing objects included in the raw data 610, as output data.

The second model 630 is a model included in a server capable of communicating with the self-driving car, and like the first model 620, refers to a model configured to receive the raw data 610 as input data, and output a result of recognizing objects included in the raw data 610, as output data. The camera module of the self-driving car is controlled such that the collected raw data 610 is transmitted to the second model 630 as well as the first model 620 through a communication module, and then processed.

Output data from the first model 620 and the second model 630 may include information about at least one of the relative location, size, and direction of a vehicle, a pedestrian, and the like included in each frame of an image.

In the present disclosure, the first model 620 operates in a limited environment with relatively limited resources compared to the second model 630, due to the nature of being mounted on the self-driving car. Due to the difference in model scale as above, information about the number and types of objects recognized in the image by inputting the raw data 610 to the second model 630 may be more improved than information about the number and types of objects recognized by inputting the raw data 610 into the first model 620.

for objects included in the raw data 610, i.e., cars, pedestrians, trucks, buses, two-wheelers, and miscellaneous objects (misc).

Tables 2 and 3 shows examples of quantifying the performance of the first model 620 and the second model 630, and thus, the first model 620 and the second model 630 in the present disclosure are not limited to YoloV4-CSP and YoloV4-P7 shown in Table 2 and Table 3, respectively.

The deviation data calculation module 640 may analyze the output data from the first model 620 and the second model 630 to calculate the deviation data 645. The deviation data 645 refers to data regarding a deviation between a result of inputting the raw data 610 to the first model 620 and a result of inputting the raw data 610 to the second model 630, and in more detail, may be calculated by comparing the same frames with each other. For example, when the raw data 610 is video data composed of 10 frames, the deviation data 645 may be a result of calculating a deviation by comparing a result of inputting the first frame of the raw data 610 to the first model 620 with a result of inputting the first frame of the raw data 610 to the second model 630.

The deviation data calculation module 640 may calculate intersection-over-union (IoU) values of bounding boxes for the respective frames constituting the raw data 610, match the bounding boxes with the highest IoU values, and determine the bounding box detected only in the output data from the second model 630, as a weakness point target, based on a result of the matching, and transmit the weakness point target to the weakness point analysis module. The method, performed by the deviation data calculation module 640, of calculating deviation data by matching bounding boxes between frames based on IoU values is described above with reference to FIG. 5, and thus will be omitted.

TABLE 2

| Class | Images | Targets | P | R | mAP@.5 | mAP@.5:.95: |
|---|---|---|---|---|---|---|
| all | 6.74e+03 | 7.57e+04 | 0.497 | 0.888 | 0.861 | 0.598 |
| car | 6.74e+03 | 4.26e+04 | 0.594 | 0.928 | 0.918 | 0.683 |
| pedestrian | 6.74e+03 | 1.46e+04 | 0.46 | 0.861 | 0.82 | 0.491 |
| truck | 6.74e+03 | 6.49e+03 | 0.501 | 0.886 | 0.862 | 0.626 |
| bus | 6.74e+03 | 5.85e+03 | 0.542 | 0.937 | 0.923 | 0.704 |
| two wheeler | 6.74e+03 | 5.67e+03 | 0.434 | 0.85 | 0.807 | 0.5 |
| misc | 6.74e+03 | 484 | 0.451 | 0.866 | 0.832 | 0.583 |

TABLE 3

| Class | Images | Targets | P | R | mAP@.5 | mAP@.5:.95: |
|---|---|---|---|---|---|---|
| all | 6.74e+03 | 7.57e+04 | 0.629 | 0.96 | 0.943 | 0.754 |
| car | 6.74e+03 | 4.26e+04 | 0.724 | 0.98 | 0.976 | 0.812 |
| pedestrian | 6.74e+03 | 1.46e+04 | 0.619 | 0.956 | 0.938 | 0.691 |
| truck | 6.74e+03 | 6.49e+03 | 0.6 | 0.967 | 0.948 | 0.782 |
| bus | 6.74e+03 | 5.85e+03 | 0.631 | 0.976 | 0.965 | 0.815 |
| two wheeler | 6.74e+03 | 5.67e+03 | 0.609 | 0.934 | 0.914 | 0.682 |
| misc | 6.74e+03 | 484 | 0.591 | 0.95 | 0.916 | 0.745 |

Table 2 and Table 3 are examples of quantifying the performance of the first model 620 and the second model 630, respectively. In more detail, Table 2 shows the object recognition rate when YoloV4-CSP is used as the first model 620, and Table 3 shows the object recognition rate when YoloV4-P7 is used as the second model 630. Comparing Table 2 with Table 3, it may be seen that YoloV4-P7 is generally superior to YoloV4-CSP in the recognition rates Hereinafter, the data output by inputting the raw data 610 to the first model 620 is referred to as a first recognition result, and the data output by inputting the raw data 610 to the second model 630 is referred to as a second recognition result.

The weakness point analysis module 650 receives the deviation data from the deviation data calculation module 640, and analyzes a weakness point. Here, the weakness point refers to data regarding undetected information in a case in which an object detected by the second model 630 is not detected by the first model 620 due to the limited performance of the first model 620, which is installed in a self-driving car and thus has a relatively low amount of computation compared to the second model 630. For example, in a case in which the second model 630 receives the raw data 610 and recognizes one car and one bus as objects in the image whereas the first model 620 receives the raw data 610 and recognizes a car as an object in the image, the weakness point may be information about the bus that is not recognized (detected) by the first model 620.

The weakness point analyzed by the weakness point analysis module 650 may be used as training data for improving the object recognition performance of the first model 620. In addition, the weakness point may be prepro- cessed by a series of preprocessing processes (or filtering processes) so as to be used as training data for the first model 620, which will be described below.

In FIG. 6, the first model 620, the deviation data calcu- lation module 640, and the weakness point analysis module 650 may be implemented to be physically or logically included in the device for improving an object recognition rate of a self-driving car according to an embodiment of the present disclosure. In addition, in FIG. 6, the first model 620, the second model 630, the deviation data calculation module 640, and the weakness point analysis module 650 may be referred to as other names when the present disclosure is actually implemented, and may be implemented such that one module is integrated into another.

Figure 7A:
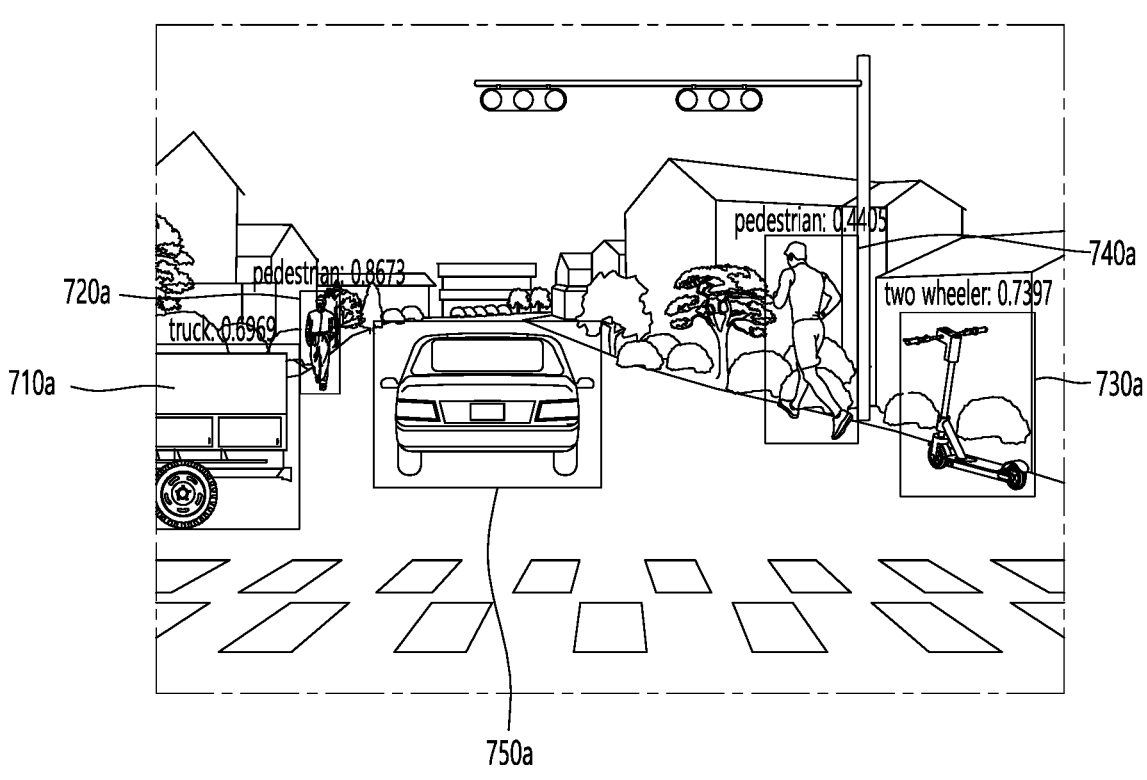
FIGS. 7A to 7C are diagrams for describing a filtering process performed by a device for improving an object recognition rate, according to an embodiment of the present disclosure.
Figure 7B:
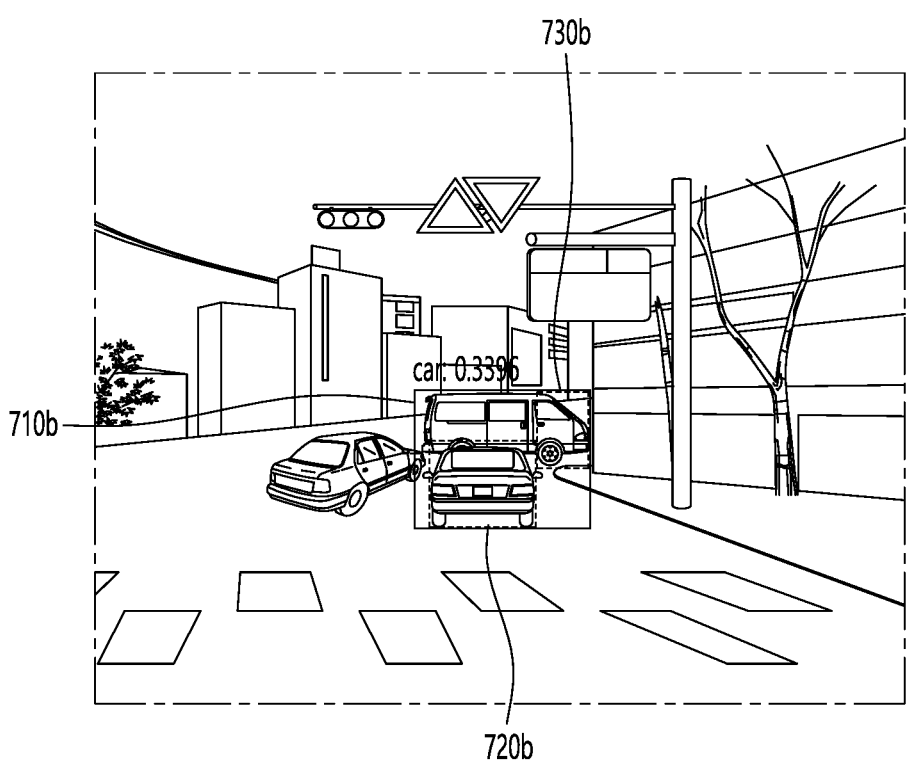
Figure 7C:
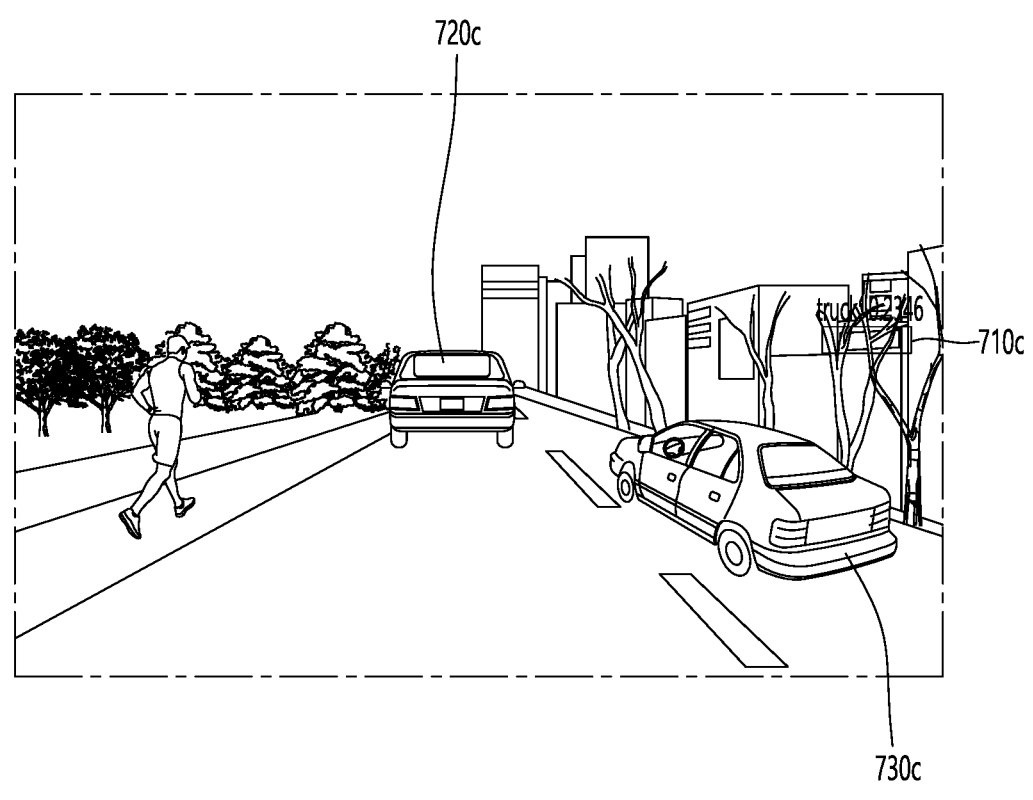

FIGS. 7A to 7C are diagrams for describing a filtering process performed by a device for improving an object recognition rate, according to an embodiment of the present disclosure.

First, FIG. 7A illustrates deviation data before being filtered and schematically illustrates that a first object 710a, a second object 720a, a third object 730a, a fourth object 740a, and a fifth object 750a are recognized as objects. In more detail, it may be understood that the five objects illustrated in FIG. 7A are not recognized in a first recogni- tion result, but are recognized in a second recognition result, thus processed as deviation data, and then transmitted to the weakness point analysis module 650, and the weakness point analysis module 650 may perform filtering based on a preset filtering criterion, leaving only meaningful object information in the deviation data.

For example, the preset filtering criterion may be a size criterion for the size of bounding boxes included in the deviation data, and the weakness point analysis module 650 may remove bounding boxes smaller than the size criterion, based on the deviation data. Here, the size criterion may be a criterion for removing a bounding box having a height of less than 120 pixels or a width of less than 120 pixels, but the above values are exemplary values, and thus, the crite- rion value for the height or width may vary depending on the embodiment.

As another example, the preset filtering criterion may be a classification criterion for classifying the types of objects of bounding boxes included in the deviation data, and the weakness point analysis module 650 may remove bounding boxes of a particular type of object according to the classi- fication criterion, based on the deviation data. Here, the particular type refers to a class indicated at the top of the bounding box, and a total of four types of classes (i.e., car, truck, pedestrian, two-wheeler) are illustrated in the five bounding boxes of FIG. 7A.

In a case in which both a size criterion for removing bounding boxes having a height of less than 120 pixels or a width of less than 120 pixels, and a classification criterion for removing bounding boxes for pedestrians or two-wheel- ers are included in filtering criteria set in the weakness point analysis module 650, in FIG. 7A, the second object 720a, the third object 730a, and the fourth object 740a are removed, and only the first object 710a and the fifth object 750a remain.

FIG. 7B illustrates deviation data before being filtered, like FIG. 7A, and schematically illustrates that a sixth object 710b is recognized as an object.

In more detail, it may be understood that the sixth object 710b illustrated in FIG. 7B is not recognized in a first recognition result, but is recognized in a second recognition result, thus processed as deviation data, and then transmitted to the weakness point analysis module 650, and the weak- ness point analysis module 650 may perform filtering based on a preset filtering criterion, leaving only meaningful object information in the deviation data.

However, it may be seen from FIG. 7B that the sixth object 710b is not one object but is misrecognized as one object as a seventh object 720b and an eighth object 730b accidentally overlap each other, and a significantly low confidence of 0.3396 is indicated due to the morphological characteristics.

For example, in FIG. 7B, the preset filtering criterion may be a confidence criterion for the confidence of bounding boxes included in the deviation data, and the weakness point analysis module 650 may remove bounding boxes having a confidence less than the confidence criterion, based on the deviation data. Here, the confidence criterion may be 0.6, but may vary depending on the embodiment.

In FIG. 7B, the weakness point analysis module 650 may remove the bounding box of the sixth object 710b according to the confidence criterion, and because there is no remain- ing bounding box in the frame of FIG. 7B after the bounding box of the sixth object 710b is removed, the first recognition result and the second recognition result may be determined as substantially the same. That the first recognition result and the second recognition result are substantially the same means that the first model 620 does not need to learn the sixth object 710b.

FIG. 7C illustrates deviation data before being filtered, like FIGS. 7A and 7B, and schematically illustrates that a ninth object 710c, a tenth object 720c, and an eleventh object 730c are recognized as objects.

In more detail, FIG. 7C illustrates that, among the objects illustrated in FIG. 7C, the tenth object 720c and the eleventh object 730c are vehicles recognized as objects in both a first recognition result and a second recognition result, and their bounding boxes are removed, but although the ninth object 710c is an object that is unlikely to affect the driving of the self-driving car on the road, the ninth object 710c is clas- sified as a truck class and a bounding box is applied to the ninth object 710c.

In general, a large number of objects are recognized by the second model 630 having higher recognition performance, but in a particular case, the first model 620 may misrecog- nize a non-object part as an object, or the second model 630 may malfunction to recognize, as a normal object, a part that is not an object and thus is not recognized by the first model 620, and the weakness point analysis module 650 may determine, according to a preset filtering criterion, that the ninth object 710c is an object that exists only on a road but the ninth object 710c is at a location other than an actual road, and thus remove the bounding box of the ninth object 710c. In FIG. 7C, after the bounding box of the ninth object 710c is removed, the difference between the first recognition result and the second recognition result is substantially eliminated, and thus, data to be learned by the first model 620 is also eliminated.

Figure 8:
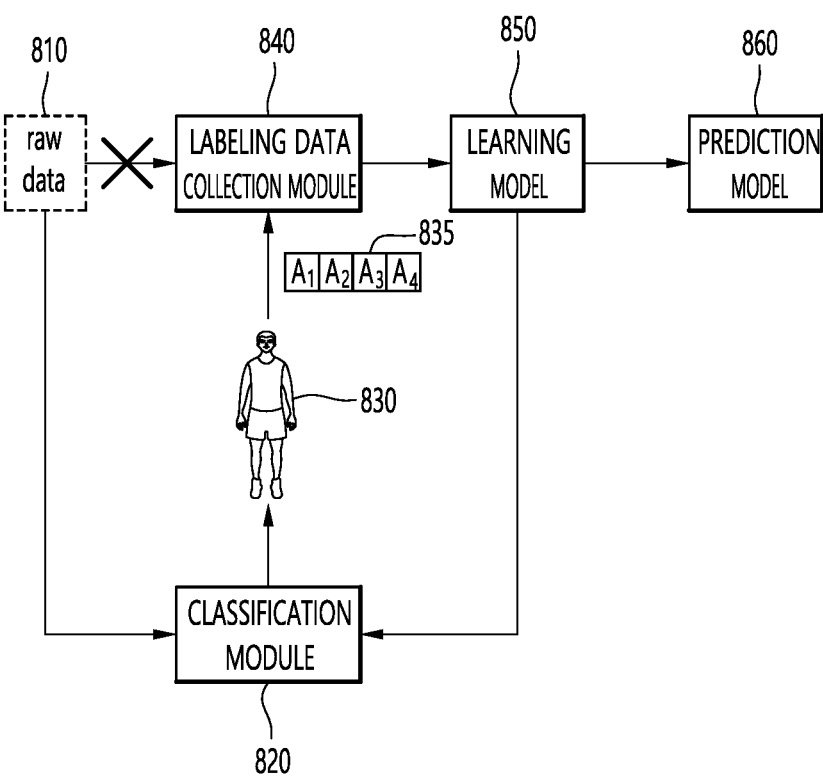
FIG. 8 is a diagram for describing a process in which active learning is applied to improve an object recognition rate of a self-driving car, according to another embodiment of the present disclosure.

FIG. 8 is a diagram for describing a process in which active learning is applied to improve an object recognition rate of a self-driving car, according to another embodiment of the present disclosure.

The device for improving an object recognition rate according to the present disclosure may physically or logically include a classification module 820, a labeling data collection module 840, a learning model 850, and a prediction model 860 illustrated in FIG. 8. In FIG. 8, the learning model 850 is regarded as a model being trained based on input data, the prediction model 860 is determined as a predictive model capable of outputting result data upon test data being input after the training is completed, and the learning model 850 is a model whose recognition rate is improved through the training, and thus refers to the first model 620 mounted on the self-driving car.

In general, labeling of data, which is an essential process of preprocessing raw data to perform machine learning, is performed by a human because the features of the data are not accurately classified, but the device for improving an object recognition rate according to the present disclosure induces the learning model 850 to rapidly and efficiently learn the features of raw data 810 by performing active labeling by active learning, which includes a part of auto-labeling.

In FIG. 8, the raw data 810 refers to images captured and collected by a camera while the self-driving car is driving, as in FIG. 6.

The raw data 810 may be automatically labeled by the classification module 820. In detail, in a case in which the raw data 810 is an image composed of a plurality of frames, the classification module 820 automatically recognizes an object in each frame and automatically classify classes of objects, for example, object a of a particular frame as a truck, object b as a pedestrian, and object c as a two-wheeler.

While analyzing the raw data 810, the classification module 820 does not automatically perform labeling on objects that has been determined, through an internal classification algorithm, to be difficult to classify, and here, the objects determined to be difficult to classify may be weakness points described above with reference to FIGS. 6 to 7C. That is, the first object 710a and the fifth object 750a of FIG. 7A, which are determined to be a difference between results of the first model 620 and the second model 630 even after being filtered by the filtering criterion may be an object determined by the classification module 820 to be difficult to classify. Information about object determined to be difficult to classify is automatically collected by the classification module 820 and then delivered to a user 830 who has obtained an advanced classification criterion, and after completing labeling of the data, the user 830 delivers labeling data 835 to the labeling data collection module 840.

The labeling data collection module 840 receives automatically labeled data from the classification module 820 and manually labeled data from the user 830, and controls the learning model 850 to learn the labeled data. A process is repeatedly performed in which data that the learning model 850 has not learned due to irregularity is delivered to the classification module 820, then labeled by the classification module 820 or the user 830, and input to the learning model 850, and a model that has finally completed learning to perform object recognition on the raw data 810 becomes the prediction model 860, and thus is able to accurately recognize objects included in newly input raw data 810.

As described above, because the user 830, who has obtained the advanced classification criterion, performs labeling on only selected partial data, and active learning is applied to automatically perform labeling on the remaining data, the learning model 850 according to the present disclosure may rapidly and accurately learn the training data (information about objects in an image), and because the filtering criterion described above with reference to FIGS. 7A to 7C is applied to the classification module 820, the amount of labeling work that the user 830 has to manually perform may be significantly reduced. That is, according to the present disclosure, it is possible to minimize excessive costs (time costs, financial costs) caused by the existing labeling work.

FIG. 9 is a flowchart illustrating an example of a method of improving an object recognition rate according to the present disclosure.

Because the method according to FIG. 9 may be implemented by the above-described device for improving an object recognition rate, hereinafter, descriptions will be provided with reference to FIGS. 6 to 8, and the descriptions provided above with reference to FIGS. 6 to 8 will be omitted.

The device for improving an object recognition rate may recognize an object included in a first image obtained while driving, by using a first recognition method, and calculate a first recognition result (S910).

The device for improving an object recognition rate may receive a second recognition result obtained by recognizing an object included in the first image by using a second recognition method (S930).

The device for improving an object recognition rate may calculate deviation data of the first recognition result and the second recognition result (S950).

The device for improving an object recognition rate may control the first model to be trained, by using information based on the deviation data calculated in operation S950, to recognize an object included in an image by using the first recognition method (S970).

Figure 10:
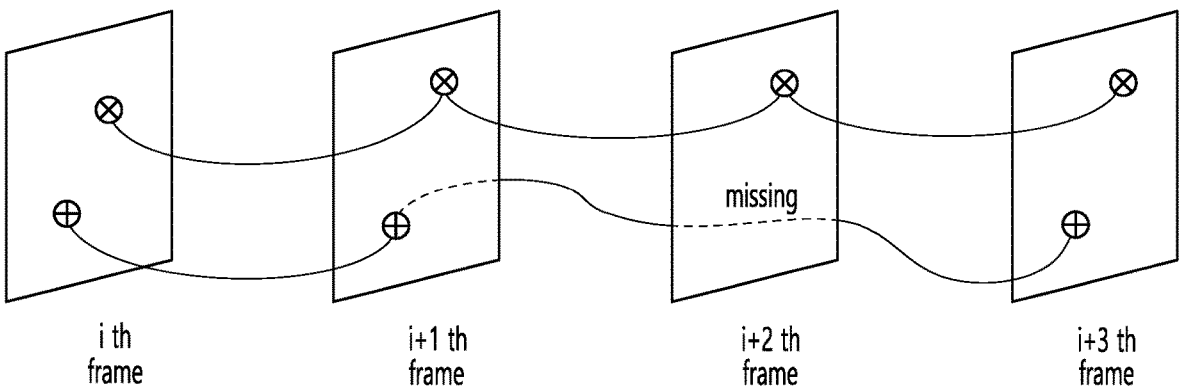
FIG. 10 is a diagram for describing a method of improving an object recognition rate according to another embodiment of the present disclosure.

FIG. 10 is a diagram for describing a method of improving an object recognition rate according to another embodiment of the present disclosure.

The present alternative embodiment shares some of the processes of the method of improving an object recognition rate described above with reference to FIGS. 6 to 9. The process of recognizing an object by analyzing an image obtained while driving is performed in the same manner, but unlike the method of FIG. 6 in which objects are recognized by applying different recognition methods to the same image and deviation data is calculated, in the present embodiment, objects included in an image are recognized by using one recognition method. In order to be distinguished from the first model 620 and the second model 630 described above, a model for recognizing an object in an image will be referred to as a recognition model in the present embodiment.

FIG. 10 illustrates a total of four frames and at least one object is at a particular location in each frame. In more detail, it may be seen from FIG. 10 that it is recognized that objects exist in upper portions and lower portions of the i-th frame, the (i+1)-th frame, and the (i+3)-th frame, but in the (i+2)-th frame, the object in the lower portion is temporarily missing and it is recognized that only the object in the lower portion exists. The device for improving an object recognition rate according to the present embodiment may determine, as a weakness point, a case in which a particular object suddenly disappears in a particular frame and then is recognized within a short time period in a process of tracking a particular object, as illustrated in FIG. 10, and convert the weakness point into training data for training a recognition model.

That is, in the present embodiment, when an object being normally tracked disappears in a particular frame and then reappears, it may be determined that a performance limit of an object recognition module of a self-driving car has occurred, and thus, additional training may be performed on the object recognition module to improve the object recognition performance.

that the preset time period in FIG. 10 is a time range value for one frame. In a case in which the preset time period is a time range value for three frames and the first object being tracked in the i-th frame disappears in the (i+1)-th frame and then reappears in the (i+5)-th frame, the first object may be determined as having disappeared for the preset time period.

Based on detecting that the first object reappears, the device for improving an object recognition rate may calculate training data for the first object (S1150). In a case in which the first object does not reappear after disappearing, or the first object reappears after a preset time period has elapsed, the device for improving an object recognition rate determines that the condition is not satisfied and does not

TABLE 4

|  | Embodiment of FIG. 6 | Embodiment of FIG. 10 |
| --- | --- | --- |
| Basic process | Identify a weakness point of a recognition model installed in a self-driving car, by using result data from two models that recognize objects in an image with different recognition methods | Identify a weakness point of a recognition model installed in a self-driving car, based on that an object being tracked by a recognition model that recognizes an object in an image by using a predetermined recognition method temporarily disappears and then reappears in a short time period |
| Summary of differences | 1) Both the first model and the second model are required 2) Comparing the same frames | 1) Only the first model is required 2) Comparing the presence/absence of objects in consecutive frames of one image |

Table 4 shows differences between the embodiment described above with reference to FIGS. 6 to 9 and the embodiment described above with reference to FIG. 10. It may be seen from Table 4 that the two embodiments of the present disclosure have the same purpose of identifying a point where a weakness point in the performance of an object recognition module mounted on a self-driving car occurs, and generating training data for supplementing the identified weakness point to rapidly and efficiently train the object recognition module (recognition model), but there are some differences in configuration for implementing the embodiments.

Figure 11:
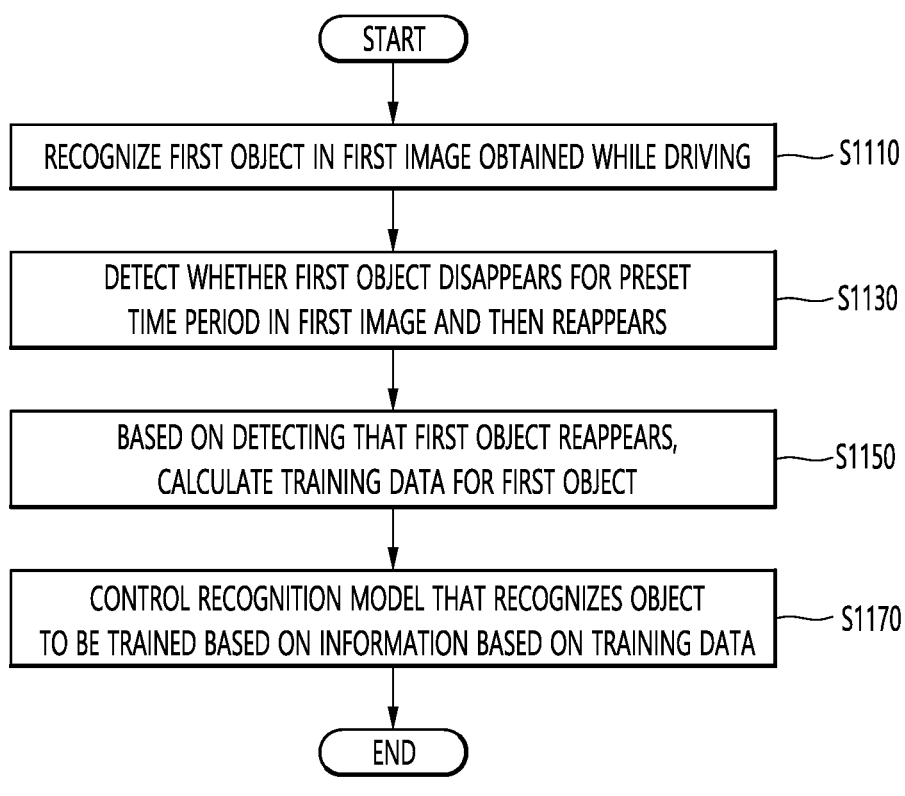
FIG. 11 is a flowchart illustrating the method of improving an object recognition rate according to the embodiment described above with reference to FIG. 10.

FIG. 11 is a flowchart illustrating the method of improving an object recognition rate according to the embodiment described above with reference to FIG. 10.

First, the device for improving an object recognition rate may recognize a first object in a first image obtained while driving (S1110). Here, that the device for improving an object recognition rate has recognized the first object in the first image means that, as illustrated in FIG. 10, the device for improving an object recognition rate has identified information about the size and class of the first object by recognizing the first object in frames constituting the first image.

Next, the device for improving an object recognition rate may detect whether the first object disappears for a preset time period in the first image and then reappears (S1130). Here, the preset time period may be a time range value for one or more frames. In a case in which the frame rate of the collected first image is 30 frames/sec, the preset time period may be a time range value corresponding to a time period from 0 sec to 1/30 sec.

As another example, the preset time period may be a time range value for one frame to three frames, and it may be seen calculate the training data for the first object. In particular, in a case in which the first object reappears after a time period longer than the preset time period has elapsed after disappearing, it is highly likely that the recognition model was unable to recognize the first object because the first object was blocked by another object, rather than due to the limitation of recognition performance, and thus, it cannot be seen that the condition for calculating the training data is satisfied.

In operation S1150, the training data may include at least one of the size, position, and class of the first object, information about a history of the first object reappearing after disappearing for a preset time period after being first recognized, and information about the confidence of the first object.

The device for improving an object recognition rate may control a recognition model of a self-driving car that recognizes an object in an image obtained while driving, to be trained based on information based on the training data calculated in operation S1150 (S1170).

In operation S1170, the information based on the training data refers to information obtained by processing at least once the training data calculated in operation S1150 to be input to the recognition model, and for example, may be information obtained by filtering the training data with a preset filtering criterion.

In an optional embodiment, the preset filtering criterion may be a filtering criterion for the time length of a series of frames where the first object is recognized in the first frame, disappears in the second frame, and reappears in the third frame, and the device for improving an object recognition rate may calculate the information based on the training data only in a case in which the time length between the first frame and the third frame is longer than a length of 10 frames according to the filtering criterion. The filtering criterion means that only objects that have been tracked for a sufficiently long time period through several frames are to be selectively learned.

In the present optional embodiment, the length of 10 frames may be referred to as a reference frame length, and may be a variable value. For example, the reference frame length may be determined according to at least one of the frame rate of the first image, the moving speed of the first object in the first image, the FoV of the camera that has captured the first image, the angle of the camera that has captured the first image, and the distortion rate of the lens of the camera that has captured the first image. That is, the reference frame length may be shorter or longer than 10 frames according to embodiments. According to the present disclosure, by considering the speed of the first object and the physical and logical state of the camera, more accurate object recognition than the related art is possible.

In another optional embodiment, the preset filtering criterion may be a classification criterion for classifying the type of the first object that has been recognized in the first frame, then disappeared for a preset time period in the second frame, and then reappeared in the third frame, and the device for improving an object recognition rate may calculate the information based on the training data only in a case in which the type (class) of the first object is car, truck, bus, or misc. according to the classification criterion. The filtering criterion means that cars, trucks, buses, and miscellaneous objects, which are objects with a high importance in self-driving, are to be mainly learned.

In another optional embodiment, the preset filtering criterion may be a size criterion for identifying the size of the first object that has been recognized in the first frame, then disappeared for a preset time period in the second frame, and then reappeared in the third frame, and the device for improving an object recognition rate may calculate the information based on the training data in a case in which the height or width of the first object is greater than a preset number of pixels according to the size criterion. The filtering criterion means that the recognition model is to be trained only for the sufficiently large first object.

As described above with reference to the comparison in Table 4, a case in which the recognition model is unable to recognize an object that has disappeared and then reappeared even though the object has not completely disappeared in the section where the object has disappeared occurs due to the limited performance of the recognition model, and thus may be classified as a weakness point of the recognition model as described above with reference to FIG. 8, and in this case, active learning may be applied in the same manner.

That is, in a case in which the type of an object included in the training data is accurately labeled through an input by a user who is well-informed of the classification criteria of objects, the labeled data may be input to the recognition model through the labeling data collection module, as information based on the training data. When the recognition model that has been trained through repetitive learning receives a second image as new test data, the recognition model is able to accurately recognize a second object of the second image without frame loss.

Figure 12:
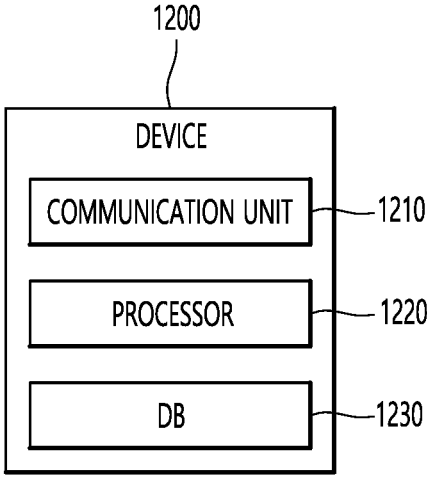
FIG. 12 is a block diagram of a device for improving an object recognition rate according to an embodiment.

FIG. 12 is a block diagram of a device for improving an object recognition rate according to an embodiment.

Referring to FIG. 12, a device 1200 for improving an object recognition rate may include a communication unit 1210, a processor 1220, and a database (DB) 1230. FIG. 12 illustrates the device 1200 for improving an object recognition rate including only the components related to an embodiment. Therefore, it would be understood by those of skill in the art that other general-purpose components may be further included in addition to those illustrated in FIG. 12.

The communication unit 1210 may include one or more components for performing wired/wireless communication with an external server or an external device. For example, the communication unit 1210 may include at least one of a short-range communication unit (not shown), a mobile communication unit (not shown), and a broadcast receiver (not shown).

The DB 1230 is hardware for storing various pieces of data processed by the device 1200 for improving an object recognition rate, and may store a program for the processor 1220 to perform processing and control.

The DB 1230 may include random-access memory (RAM) such as dynamic RAM (DRAM) or static RAM (SRAM), read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 1220 controls the overall operation of the device 1200 for improving an object recognition rate. For example, the processor 1220 may execute programs stored in the DB 1230 to control the overall operation of an input unit (not shown), a display (not shown), the communication unit 1210, the DB 1230, and the like. The processor 1220 may execute programs stored in the DB 1230 to control the operation of the device 1200 for improving an object recognition rate.

The processor 1220 may control at least some of the operations of the device 1200 for improving an object recognition rate described above with reference to FIGS. 1 to 11.

For example, as described above with reference to FIGS. 6 to 9, the processor 1220 may calculate a first recognition result by recognizing an object included in a first image obtained by using a first recognition method while a car is driving, receive a second recognition result of recognizing an object included in the first image by using a second recognition method, calculate deviation data of the first recognition result and the second recognition result, and control a first model that operates based on the first recognition method to be trained based on information based on the calculated deviation data.

As another example, as described above with reference to FIGS. 10 and 11, the processor 1220 may recognize a first object in a first image obtained while driving, detect whether the first object has disappeared for a preset time period and then reappeared in the first image, based on detecting that the first object has reappeared, calculate training data for the first object, and control a recognition model for recognizing an object included in an image to be trained based on information based on the calculated training data.

The processor 1220 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

The device 1200 for improving an object recognition rate may be an electronic device embedded in a vehicle. For example, the device 1200 for improving an object recognition rate may be an electronic device that is manufactured and then inserted into a vehicle through tuning.

The embodiments of the present disclosure described above may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and usable by those skill in the art of computer software. Examples of the computer program may include not only machine code, such as code made by a compiler, but also high-level language code that is executable by a computer by using an interpreter or the like.

Particular executions described herein are merely examples and do not limit the scope of the present disclosure in any way. For the sake of brevity, conventional electronics, control systems, software and other functional aspects of the systems may not be described in detail. Furthermore, line connections or connection members between elements depicted in the drawings represent functional connections and/or physical or circuit connections by way of example, and in actual applications, they may be replaced or embodied with various suitable additional functional connections, physical connections, or circuit connections. Moreover, no item or component is essential to the practice of the present disclosure unless the item or component is specifically described as being "essential" or "critical".

The term 'the' and other demonstratives similar thereto in the specification of the present disclosure (especially in the following claims) should be understood to include a singular form and plural forms. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of the methods described herein may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. In addition, various modifications, combinations, and adaptations will be readily apparent to those skill in the art without departing from the following claims and equivalents thereof.

According to the present disclosure, the object recognition rate of a self-driving car operating in a manner of recognizing an object on a road by obtaining an image with a camera while driving may be remarkably improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of improving an object recognition rate of a self-driving car, the method comprising:

recognizing a first object in a first image obtained while driving;

detecting whether the recognized first object has disappeared for a preset time period and then reappeared in the first image;

based on detecting that the first object has reappeared, calculating training data for the first object;

controlling such that a recognition model for recognizing an object included in an image is to be trained based on information based on the calculated training data; and calculating information based on the calculated training data by filtering the calculated training data based on a preset filtering criterion, wherein the first image is a video comprising a plurality of frames, the preset filtering criterion is a filtering criterion for a time length of a series of frames in which the first object has disappeared for the preset time period in a second frame after being recognized in a first frame and then reappeared in a third frame, the calculating of the information based on the calculated training data comprises, based on a time length between the first frame and the third frame being longer than a reference frame length, calculating the information based on the training data, and the reference frame length is determined according to at least one of a frame rate of the first image, a moving speed of the first object in the first image, a field of view of a camera that has captured the first image, an angle of the camera that has captured the first image, and a distortion rate of a lens of the camera that has captured the first image.

2. The method of claim 1, further comprising recognizing a second object in a second image obtained while driving without frame loss by recognizing the second object included in the second image by using a recognition method of the trained recognition model.

3. The method of claim 1, wherein the first image comprises at least three frames, and the preset time period is a time range value for at least one frame.

4. The method of claim 1, wherein the first image comprises at least three frames, and the preset time period is a time range value for one frame to three frames.

5. The method of claim 1, wherein the training data comprises information about a class of the first object and a history of the first object reappearing after disappearing for the preset time period after being first recognized.

6. The method of claim 5, wherein the training data further comprises information about a confidence of the first object.

7. The method of claim 1, wherein the first image is a video comprising a plurality of frames, the preset filtering criterion is a classification criterion for identifying a type of the first object that has disappeared for the preset time period in a second frame after being recognized in a first frame and then reappeared in a third frame, and the calculating of the information based on the calculated training data comprises, based on the type of the first object being a car, a truck, a bus, or a miscellaneous object, calculating the information based on the training data.

8. The method of claim 1, wherein the first image is a video comprising a plurality of frames, the preset filtering criterion is a size criterion for identifying a size of the first object that has disappeared for the preset time period in a second frame after being recognized in a first frame and then reappeared in a third frame, and the calculating of the information based on the calculated training data comprises, based on a height of the first object being greater than a preset number of pixels, calculating the information based on the training data.

9. The method of claim 1, wherein the first image is a video comprising a plurality of frames, the preset filtering criterion is a size criterion for identifying a size of the first object that has disappeared for the preset time period in a second frame after being recognized in a first frame and then reappeared in a third frame, and the calculating of the information based on the calculated training data comprises, based on a width of the first object being greater than a preset number of pixels, calculating the information based on the training data.

10. The method of claim 1, wherein the information based on the calculated training data is information obtained by applying active learning to the calculated training data.

11. The method of claim 1, wherein the information based on the calculated training data is information obtained by labeling a type of an object included in the training data through an input by a user.

12. A non-transitory computer-readable recording medium having recorded thereon a program for implementing the method of claim 1.

13. A device for improving an object recognition rate of a self-driving car, the device comprising:

a memory storing at least one program; and a processor configured to perform an operation by executing the at least one program, wherein the processor is further configured to:

recognize a first object in a first image obtained while driving, detect whether the recognized first object has disappeared for a preset time period and then reappeared in the first image, based on detecting that the first object has reappeared, calculate training data for the first object, control a recognition model for recognizing an object included in an image to be trained based on information based on the calculated training data, and calculate information based on the calculated training data by filtering the calculated training data based on a preset filtering criterion, wherein the first image is a video comprising a plurality of frames, the preset filtering criterion is a filtering criterion for a time length of a series of frames in which the first object has disappeared for the preset time period in a second frame after being recognized in a first frame and then reappeared in a third frame, wherein the processor is configured to calculate the information based on the calculated training data, further based on a time length between the first frame and the third frame being longer than a reference frame length, wherein the reference frame length is determined according to at least one of a frame rate of the first image, a moving speed of the first object in the first image, a field of view of a camera that has captured the first image, an angle of the camera that has captured the first image, and a distortion rate of a lens of the camera that has captured the first image.

* * * * *